United States Patent [19]

Landa

[11] Patent Number: 4,473,865

[45] Date of Patent: Sep. 25, 1984

[54] STATIONARY LIGHT SOURCE ELECTROPHOTOGRAPHIC COPIER

[75] Inventor: Benzion Landa, Edmonton, Canada

[73] Assignee: Savin Corporation, Stamford, Conn.

[21] Appl. No.: 340,214

[22] Filed: Jan. 18, 1982

Related U.S. Application Data

[63] Continuation of Ser. No. 959,325, Nov. 9, 1979, abandoned.

[51] Int. Cl.³ .............................................. G03B 27/54
[52] U.S. Cl. ............................................. 362/6; 362/3; 362/98; 362/217; 362/279; 362/291; 362/298; 362/342; 362/345; 355/66; 355/67; 355/3 FU
[58] Field of Search ................ 362/98, 3, 6, 217, 298, 362/301, 277, 278, 279, 290, 291, 320, 325, 342, 345, 294; 355/66, 67, 3 FU

[56] References Cited

U.S. PATENT DOCUMENTS 3,758,774 9/1973 Hildenbrandt ...................... 362/277
4,009,953 1/1978 Ravizza .............................. 355/3 R

FOREIGN PATENT DOCUMENTS

| 595146 | 3/1960 | Canada | 362/291 |
| 1057616 | 3/1954 | France | 362/292 |
| 93746 | 10/1959 | Netherlands | 350/120 |
| 404540 | 1/1934 | United Kingdom | 362/292 |
| 1424045 | 2/1976 | United Kingdom | 355/3 FU |
| 1442611 | 7/1976 | United Kingdom | 355/3 FU |

Primary Examiner—Donald P. Walsh
Attorney, Agent, or Firm—Shenier & O'Connor

[57] ABSTRACT

A stationary light source electrophotographic copier wherein collimated light from the source is directed to a scanner having upper and lower document illuminating reflectors comprising thin members of negligible mass maintained under tension. The lower reflector includes a plurality of generally horizontal slats disposed in a generally vertical array. Heat from the stationary light source is used to dry or fix copies.

10 Claims, 10 Drawing Figures

STATIONARY LIGHT SOURCE ELECTROPHOTOGRAPHIC COPIER

This application is a continuation of my copending application Ser. No. 959,325 filed Nov. 9, 1978, now abandoned.

BACKGROUND OF THE INVENTION

My invention relates to electrophotographic copiers having a stationary light source. In some prior art copiers, the light source for illuminating the original document to be copied is mounted on the scanner. This construction results in scanners of high mass and consequent limited speed of operation. As shown by Hildenbrandt in U.S. Pat. No. 3,758,774, the scanner mass may be greatly decreased by using a stationary light source having a parabolic cylindrical collimating reflector in conjunction with an upper and a lower parabolic cylindrical reflector mounted on the scanner to illuminate the document from widely differing angles and prevent shadowing of three dimensional objects. The upper reflector is mounted more remote from the light source than the illuminated region; and since the angles of incidence and reflection are less than 45°, the upper mirror assumes a general orientation of less than 45° from the vertical. The lower reflector is mounted closer to the light source than the illuminated region; and since the angles of incidence and reflection exceed 45°, the lower mirror assumes an orientation of less than 45° from the horizontal. Because of the favorable geometry of the upper reflector, it can illuminate the document over a range of angles from the normal approaching 90° without substantially increasing the length of the scanner. However, because of the unfavorable geometry of the lower reflector, it can illuminate the document only over a limited range of angles; and the length of the reflector and hence the scanner increases as the tangent of the angle of illumination from the normal. The two illuminating reflectors constitute an appreciable portion of the total mass of the scanner.

SUMMARY OF THE INVENTION

One object of my invention is to provide a stationary light source copier wherein the illuminating reflectors have negligible mass.

Another object of my invention is to provide a stationary light source copier wherein the lower reflector illuminates the document over a wide range of angles including large angles from the normal.

Still another object of my invention is to provide a stationary light source copier wherein the illuminating reflectors comprising extremely thin members maintained under sufficient tension to prevent appreciable distortion from air loads and inertial forces.

A further object of my invention is to provide a stationary light source copier wherein the lower document illuminating reflector comprises a plurality of generally horizontal reflectors disposed in a generally vertical array.

A still further object of my invention is to provide a stationary light source electrophotographic copier wherein heat generated by the light source is used to dry or fix copies.

Other and further objects of my invention will appear from the following description.

In general, my invention contemplates an electrophotographic copier having a stationary light source directing collimated light to a scanner provided with an upper and a lower document illuminating reflector. The reflectors each comprise thin members of negligible mass which are maintained under tension to provide rigidity. The lower reflector comprises a plurality of generally horizontal reflectors disposed in a generally vertical array. The lower reflector is thus disposed in a louvered manner, as the slats of an open venetian blind. Heat from the stationary, light source is used to dry or fix copies.

BRIEF DESCRIPTION OF THE DRAWINGS

In the accompanying drawings which form part of the instant specification and which are to be read in conjunction therewith and in which like reference numerals are used to indicate like parts in the various views.

DESCRIPTION OF THE PREFERRED EMBODIMENT

Figure 1:
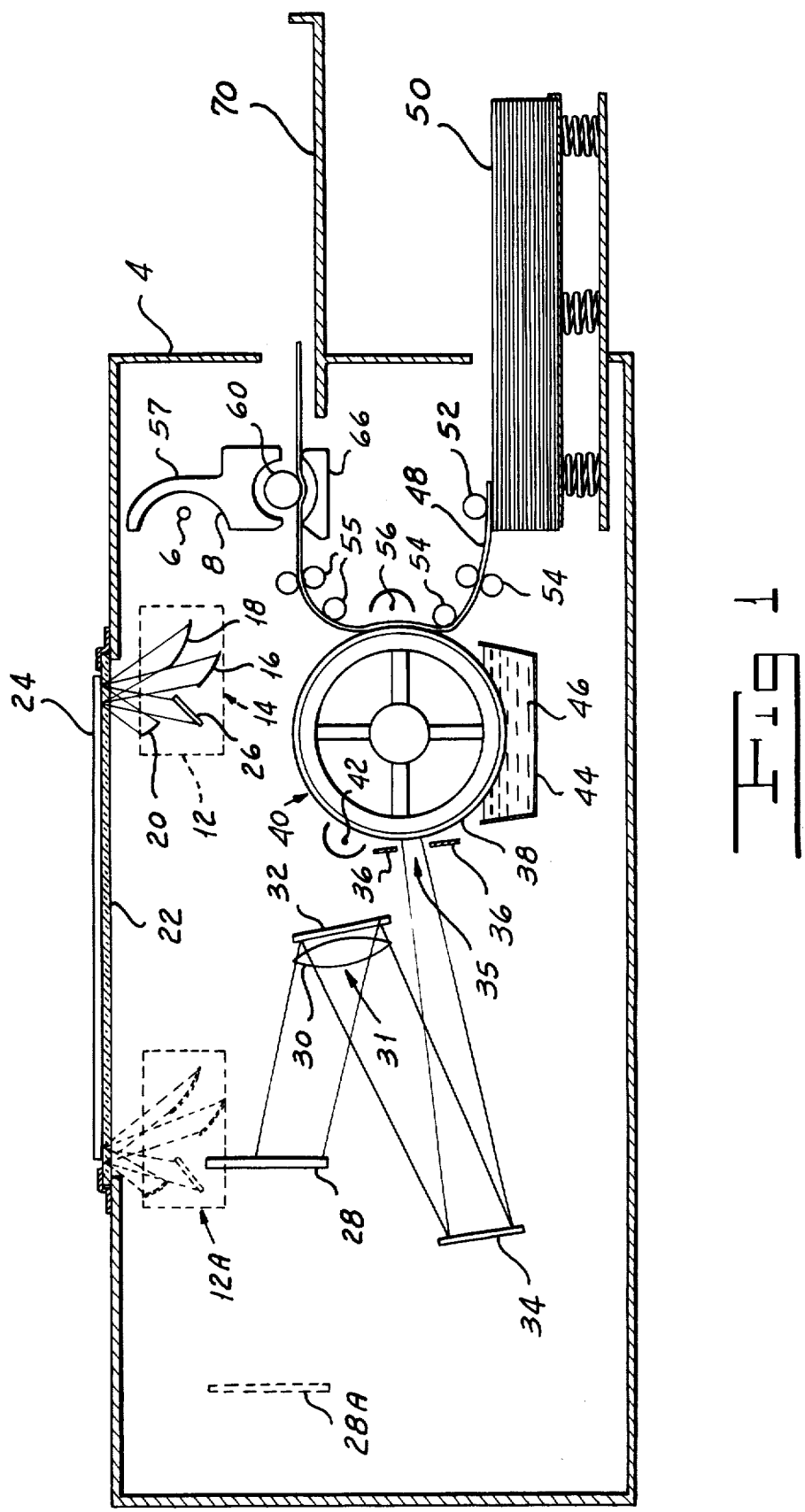
FIG. 1 is a front sectional view of an electrophotographic copier embodying my invention.

Referring to FIG. 1, elongated lamp 6 and a parabolic cylindrical reflector 8 are mounted within housing 4 of an electrophotographic copier. Collimated light from reflector 8 is directed horizontally to full-rate scanning carriage 12 which moves from the position shown to the position 12A in scanning a document 24 positioned on glass plate 22. Mounted on carriage 12 is a curved upper illuminating reflector 20 and a lower illuminating reflector 14. The lower reflector comprises two curved elements or slats 16 and 18 mounted in the fashion of a louver or open venetian blind.

Reflector 20 and slats 16 and 18 of reflector 14 bring the collimated light beam to at least a partial focus to illuminate a narrow strip of document 24 from a plurality of angles, reducing shadows from surface projections of the document or object to be copied. Since the extent of focusing provided by the illuminating reflectors is not critical and is variable within fairly wide limits, these reflectors do not require a high degree of optical precision.

Light from the illuminated strip of document 24 is reflected by a planar mirror 26 mounted on carriage 12. Light from mirror 26 is reflected from a half-rate mirror 28 and directed to a reflex lens 31 comprising lens 30 and mirror 32. Light from lens 31, after reflection from mirror 34, passes through a slit 35 between aperture plates 36 and is focused on the photoconductive surface 38 of drum 40.

As drum 40 rotates counterclockwise (in FIG. 1), surface 38 is charged by corona conductor 42, exposed to light through aperture slit 35, and developed by a liquid developer 46 in tank 44. A sheet of copy paper 48 from a stack 50 is fed by a drive roller 52 and by guide rollers 54 into contact with the developed photoconductive surface 38. Transfer corona conductor 56 charges paper 48, causing toner particles of the developer to be transferred from surface 38 to paper 48.

Collimating reflector 8 is formed in a conductive heat sink 57 which is provided with a semi-circular cylindrical recess in which is mounted a knurled heating roller 60 driven in synchronism with surface 38. Roller 60 is provided with an electrical resistance winding 61. Mounted beneath roller 60 is a dished plate 66 provided with an electrical resistance winding 67. An electrical resistance winding 58 is mounted in heat sink 57.

Figure 2:
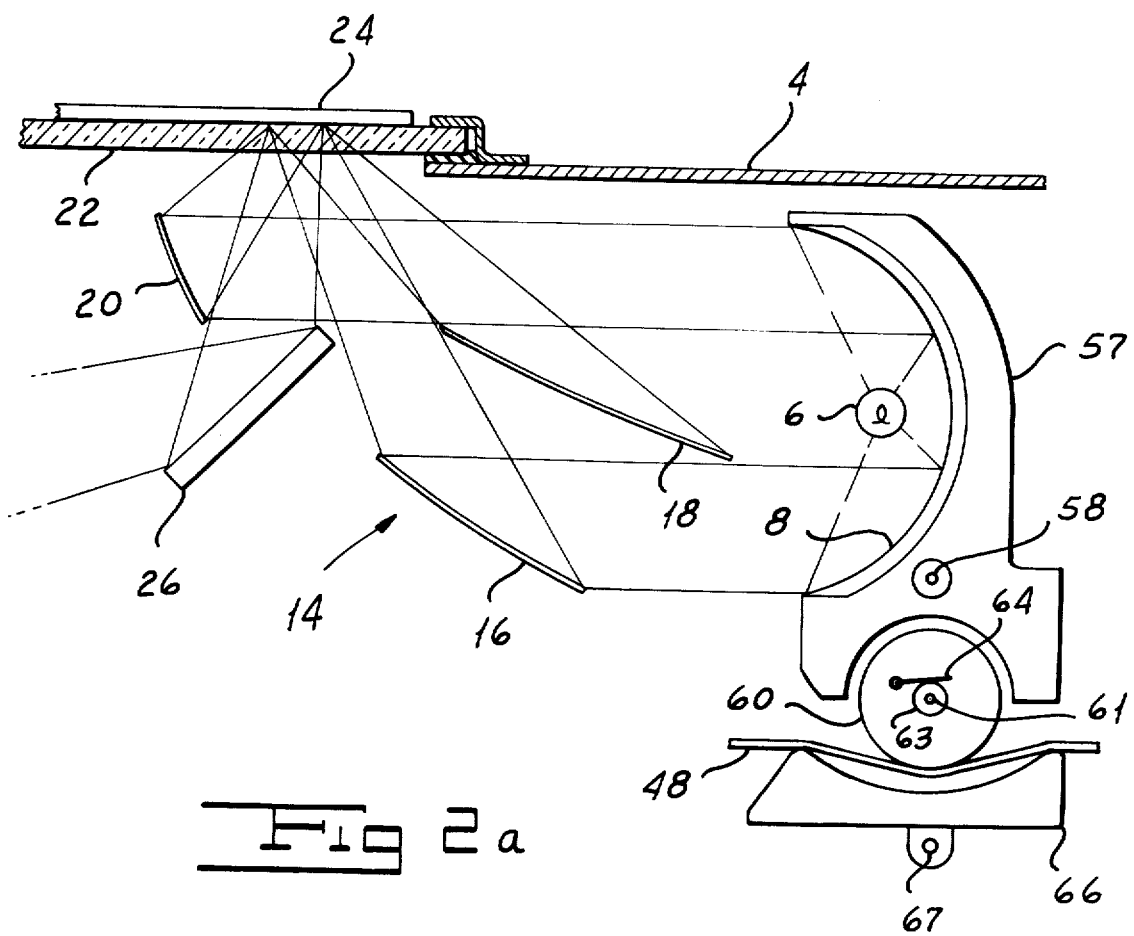
FIG. 2 is an enlarged view of the document illuminating optics of FIG. 1, showing a lower reflector having two curved louvers.
Figure 2A:
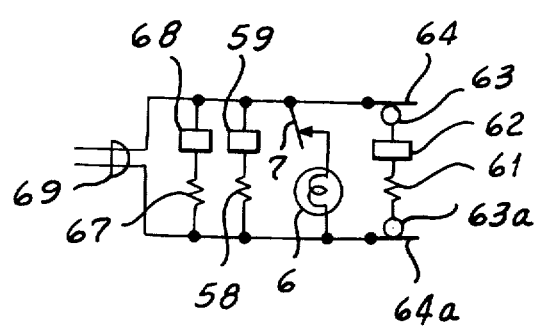
FIG. 2a is an electrical schematic view showing the excitation of the illuminating lamp and heating elements.

As shown in FIG. 2a, winding 67 is energized from wall plug 69 through regulator 68 to maintain plate 66 at a constant elevated temperature. Plug 69 also energizes winding 58 through regulator 59 to maintain heat sink 57 at a constant elevated temperature. Plug 69 is connected to brushes 64 and 64a which engage respective slip rings 63 and 63a to energize winding 61 through regulator 62 and maintain roller 60 at a constant elevated temperature. Plug 69 selectively excites lamp 6 through switch 7.

Heat from lamp 6 is conducted through sink 57 and is radiated to roller 60. Heat from sink 57 and roller 60 is also radiated to plate 66. The electrical energy dissipated in resistance windings 58, 61, and 67 to maintain heat sink 57, roller 60, and plate 66 at elevated temperatures is thus reduced. It will be appreciated that members 57, 60, and 66 tend to reach the same temperature because of heat radiation therebetween. It will also be appreciated that any two of the three resistance windings may be omitted. To insure rapid attainment of regulated temperature of members 60 and 66 after the copier is first started, I preferably provide windings 67 and 61, and omit only winding 58 and regulator 59.

Paper 48 is guided by rollers 55 between the heated plate 66 and the heated roller 60 which dry the paper and fix the developed image thereon. Thereafter copy paper 48 passes to tray 70.

Figure 3:
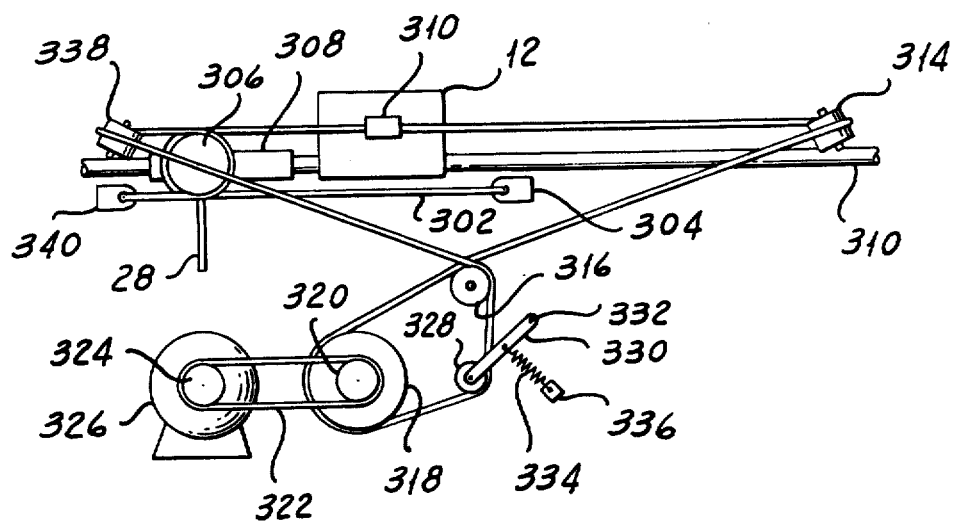
FIG. 3 is a front view of the drive mechanism for moving the scanning optics of the copier shown in FIG. 1.

FIG. 3 shows the machanism for moving carriage 12 and half-rate mirror 28. Cable 320 extends from cable anchorage 304 half-way around one grove of a two-groove sheave 306 journalled on half-rate carriage 308 which mounts mirror 28. Carriage 308 rides upon rails 310 (only one of which is shown). Cable 302 extends from sheave 306 to a clamp 310 mounted on full-rate carriage 12. Carriage 12 also rides upon rails 310 and mounts louvered lower reflector 14, upper reflector 20 and scanning mirror 26. From clamp 310, cable 302 passes over pulley 314 and over roller 316 to drum 318. Mounted coaxially with drum 318 is a pulley 320, which is driven by a belt 322 engaging a pulley 324 on the shaft of a motor 326. Cable 302 is wound around drum 318 and then passes over a tensioning pulley and over roller 316 again to a pulley 338. From pulley 338, cable 302 passes half-way around the other groove of sheave 306 to cable anchorage 340. Tensioning pulley 328 is journalled at one end of lever 330 which is rotatably mounted on fixed shaft 332. Lever 330 is biased by a spring 334 toward spring anchorage 336 to take up slack in cable 302.

As is well known to the art, carriage 12 and mirror 26 move at twice the speed of half-rate carriage 308 and mirror 28. This causes the object distance or length of the optical path from document 24 to lens 31 to remain constant so that the image on surface 38 is always in proper focus.

Figure 4:
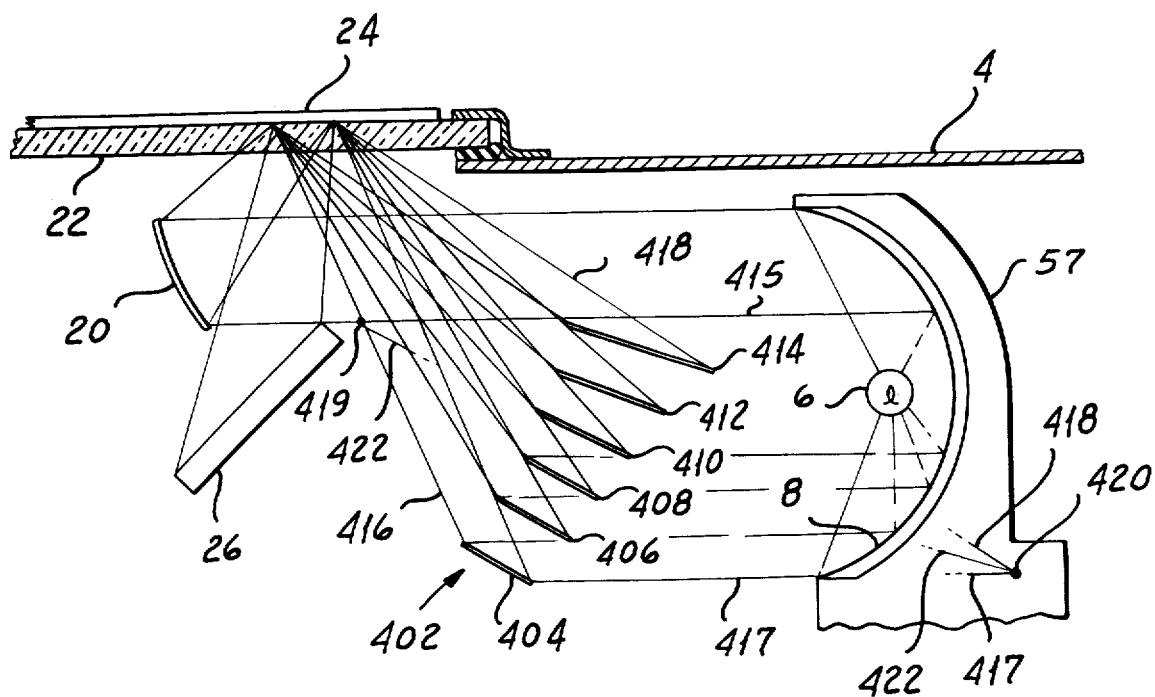
FIG. 4 is an enlarged view of document illumination optics emplying a lower reflector having six planar louvers.

FIG. 4 shows a document illumination system similar to that of FIG. 2, except that the lower reflector 402 comprises six planar elements or slats 404 through 414 mounted in the fashion of a louver or an open venetian blind. The slats are disposed in a generally linear array; and each slat extends generally orthogonal to the line of the array. Because louvered reflector 402 is comprised of planar slats, no one slat acting alone provides any focusing or light concentrating effect. However, the slats acting in conjunction with one another bring light to a partial focus, since each slat illuminates the same narrow strip of document 24.

The louvered reflectors 14 and 402 are advantageous because the uppermost slat 18 or 414 is mounted nearest the document and can thus illuminate it at a relatively large angle from the normal without greatly increasing the length of scanning carriage 12. The advantage may be illustrated by constructing in FIG. 4 an equivalent single lower reflector 422 which illuminates document 24 over the same range of angles as louvered reflector 402. Reflector 422 would extend from point 419 to point 420. Point 419 is the intersection of the horizontal light ray 415 from beam reflector 8 and the light ray 416 from the lowermost slat 404. Point 420 is the intersection of projections of the horizontal light ray 417 from beam reflector 8 and the light ray 418 from the uppermost slat 414. The initial slope of reflector 422 at point 419 would be the same as slat 404, or slightly less than 45°; and the final slope of reflector 422 at point 420 would be the same as slat 414, or appreciably less than 45°. The inordinate length of reflector 422 would require a corresponding increase in the length and weight of carriage 12 to support such reflector.

Figure 5:
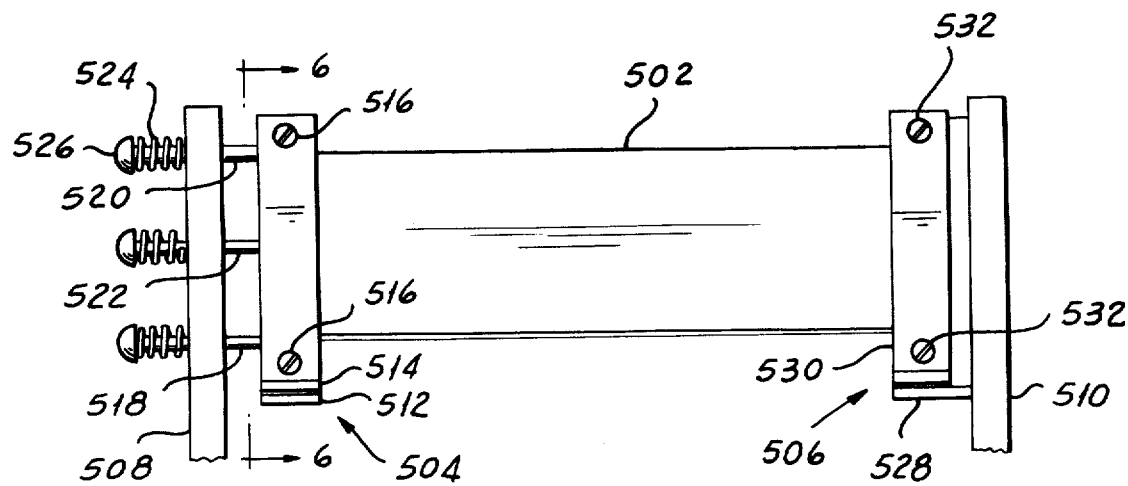
FIG. 5 is a fragmentary side view showing a curved thin reflector maintained in tension.
Figure 6:
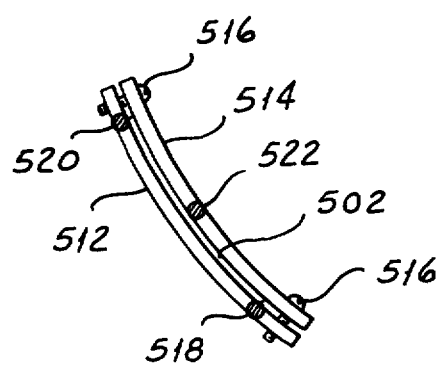
FIG. 6 is a front sectional view taken along the line 6—6 of FIG. 5.

FIGS. 5 and 6 illustrate a lightweight curved reflector suitable for the upper reflector 20 and the curved slats of lower reflector 14. A thin flexible reflective strip 502 formed for example of aluminum foil or of a plastic sheet provided with a reflective coating on one surface is secured at its ends to mountings 504 and 506. Mounting 504 comprises two curved members 512 and 514 between which one end of flexible strip 502 is clamped by screws 516. Rods 518 and 520 extend from the ends of clamp 512; and rod 522 extends from the center of clamp 514. Rods 518, 520, and 522 pass with a sliding fit through corresponding bores in side 508 of carriage 12. Each rod is provided with a head 526 and a coil spring 524 which bears against such head and against the outboard surface of side 508. Mounting 506 comprises curved members 528 and 530 between which the other end of flexible reflector 502 is clamped by screws 532. Clamp 528 is affixed to side 510 of carriage 12. Springs 524 maintain strip 502 in tension providing it with sufficient rigidity to resist appreciable distortion under air loads and inertial forces. It will be understood that members 512, 514, 528, and 530 may be straight instead of curved. With such construction, strip 502 will be a planar reflector suitable for the slats of louvered reflector 402.

Figure 7:
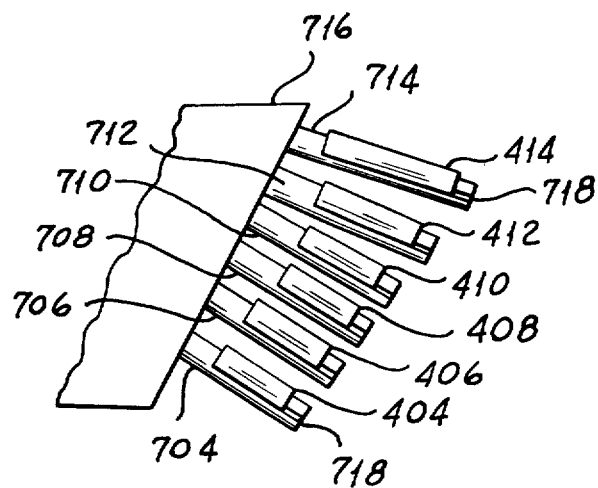
FIG. 7 is a fragmentary front view showing the mounting of the louvered reflector of FIG. 4.
Figure 8:
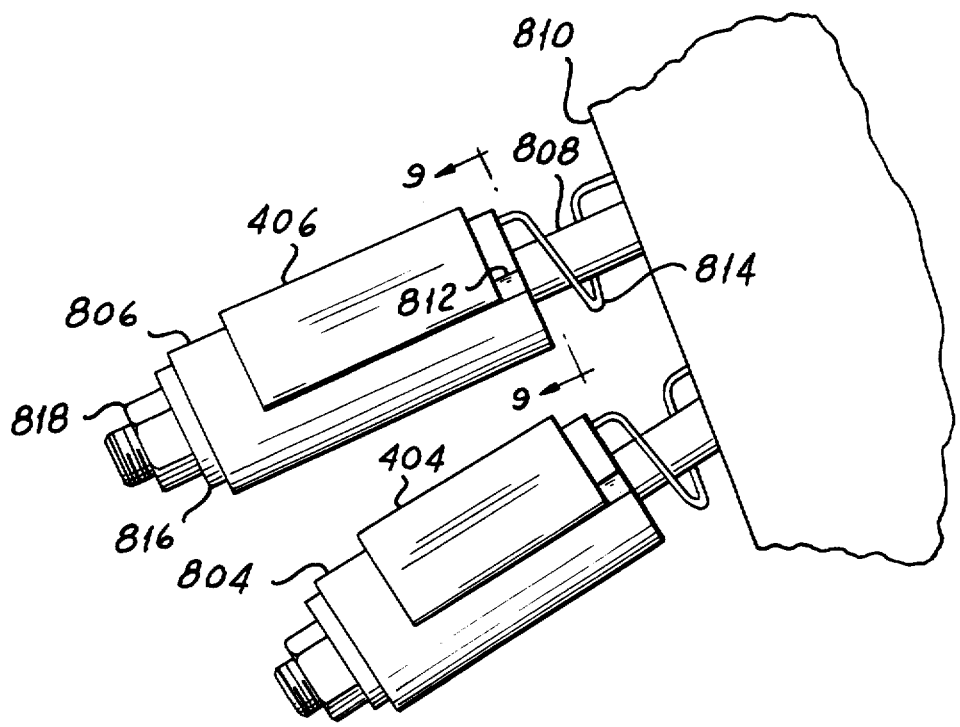
FIG. 8 is a fragmentary rear view showing the tensioning of the louvered reflecting elements of FIG. 4.
Figure 9:
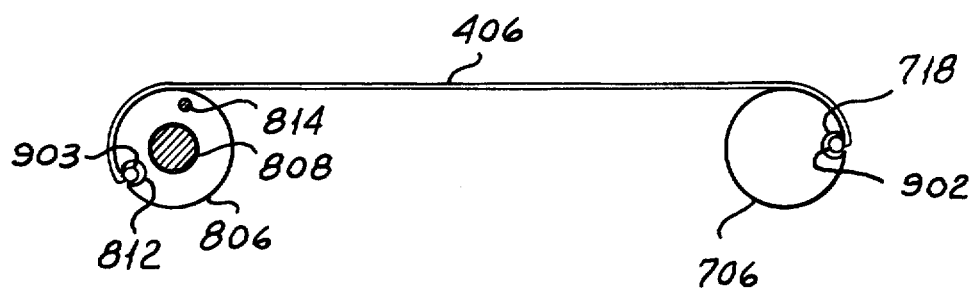
FIG. 9 is a side sectional view taken along the line 9—9 of FIG. 8.

FIGS. 7, 8, and 9 show an alternate reflector construction suitable especially for planar reflectors, as the louvered reflector 402. Flexible reflecting strips 404, 406 408, 410, 412, and 414 are mounted at one end on respective cylindrical pegs 704, 706, 708, 710, 712, and 714 secured to member 716 of carriage 12. Each peg is provided with a longitudinally extending cavity 718 having a narrow mouth. Each strip is provided with enlarged ends 902 and 903. Ends 902 are received and retained in cavities 718. Ends 903 are received and retained in similar cavities 812 in six corresponding cylindrical members, such as 804 and 806. Each cylindrical member, such as 806, is journalled on a corresponding shaft, such as 808, mounted on member 810 of carriage 12. Each cylindrical member, such as 806, is biased counterclockwise, in FIG. 9, by a corresponding helical spring, such as 814, the ends of which are mounted in members 806 and 810 and which surrounds shaft 808. Each cylindrical member, such as 806, is retained on its shaft by a corresponding washer 816 and a lock nut 818 threaded upon the end of shaft 808. Spring 814 biases cylinder 806 axially against washer 816 to maintain strip 406 positioned a proper distance from carriage member 810. The rotational bias of spring 814 maintains strip 406 in tension, providing it with sufficient rigidity to resist significant distortion under air loads and inertial forces. This tension is maintained despite some creep or gradual elongation of strip 406 in the event it is formed of a plastic having a reflective coating on one surface.

It will be seen that I have accomplished the objects of my invention. I have provided a stationary light source electrophotographic copier wherein the document illuminating reflectors mounted on the scanner have negligible mass and comprise thin members maintained under tension. The lower reflector illuminates the document over a wide range of angles including large angles from the normal and comprises a plurality of generally horizontal slats disposed in a generally vertical array. Heat from the stationary light source is coupled by conduction and radiation to dry and fix copies.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An electrophotographic copier including in combination an elongated stationary source of light which also generates heat, a parabolic cylindrical collimating reflector, said collimating reflector being thermally conductive, a scanning carriage provided with an upper and a lower illuminating reflector, said upper reflector being substantially continuous, the lower reflector comprising a plurality of slat-like members each having a reflective surface mounted in a generally linear array with each surface extending generally orthogonal to the line of the array such that incident and reflected light rays are disposed on opposite sides of the array, a length of copy paper, means including the light source and the collimating reflector and the scanning carriage and the upper and lower reflectors for providing a visible image on the copy paper, and means providing a path for transmitting heat from said source to said image, said path including a thermally conductive portion comprising the collimating reflector.

2. An electrophotographic copier including in combination an elongated stationary source of light which also generates heat, a parabolic cylindrical reflector, said reflector being thermally conductive, a length of copy paper, means including the source and the reflector for providing a visible image on the copy paper, and means providing a path for transmitting heat from said source to said image, said path including a thermally conductive portion comprising said reflector.

3. An electrophotographic copier including in combination a stationary source of light which also generates heat, a light collimating reflector, said reflector being thermally conductive, a length of copy paper, means including the light source and the reflector for providing a visible image on the copy paper, and means providing a path for transmitting heat from said source to said image, said path including a thermally conductive portion comprising said reflector.

4. An electrophotographic copier including in combination a stationary source of light, a scanning carriage provided with an upper and a lower illuminating reflector, the upper reflector being disposed more remote from the source and having a substantially continuous and generally parabolic reflecting surface of predetermined focal length, the lower reflector being disposed closer to the source and comprising a plurality of slat-like members each having a reflective surface mounted in a generally linear array with each surface extending generally orthogonal to the line of the array such that incident and reflected light rays are disposed on opposite sides of the array, one member of the lower reflector being so formed and disposed as generally to comprise a portion of a parabola having a focal length at least as great as said predetermined focal length.

5. An electrophotographic copier as in claim 4 wherein the upper reflector comprises an elongated thin flexible member, further including a first and a second pair of clamps the jaws of which are curved curvature and means including said clamps for maintaining said member under tension along its axis of elongation.

6. An electrophotographic copier as in claim 4 wherein each member of the lower reflector comprises an elongated thin flexible ribbon, further including a corresponding plurality of cylindrical rotors, means mounting each rotor for rotary movement, and means including said rotors for maintaining each ribbon under tension along its axis of elongation.

7. An electrophotographic copier as in claim 1 wherein the upper reflector comprises an elongated thin flexible member, further including a first and a second pair of clamps the jaws of which are curved and means including said clamps for maintaining said member under tension along its axis of elongation.

8. An electrophotographic copier as in claim 1 where each member of the lower reflector comprises an elongated thin flexible ribbon, further including a corresponding plurality of cylindrical rotors, means mounting each rotor for rotary movement, and means including said rotors for maintaining each ribbon under tension along its axis of elongation.

9. An electrophotographic copier including in combination an elongated stationary source of light which also generates heat, a parabolic cylindrical collimating reflector, said collimating reflector being thermally conductive, a scanning carriage provided with an upper and a lower illuminating reflector, the upper reflector being disposed more remote from the source and having a substantially continuous and generally paprabolic reflecting surface of predetermined focal length, the lower reflector being disposed closer to the source and comprising a plurality of slat-like members each having a reflective surface mounted in a generally linear array with each surface extending generally orthogonal to the line of the array such that incident and reflected light rays are disposed on opposite sides of the array, one member of the lower reflector being so formed and disposed as generally to comprise a portion of a parabola having a focal length at least as great as said predetermined focal length, a length of copy paper, means including the light source and the collimating reflector and the scanning carriage and the upper and lower reflectors for providing a visible image on the copy paper, and means providing a path for transmitting heat from said source to said image, said path including a thermally conductive portion comprising the collimating reflector.

10. An electrophotographic copier as in claim 9 wherein the upper reflector comprises an elongated thin flexible member, wherein each member of the lower reflector comprises an elongated thin flexible ribbon, further including a first and a second pair of clamps the jaws of which are curved, means including said clamps for maintaining said flexible member under tension along its axis of elongation, a corresponding plurality of cylindrical rotors, means mounting each rotor for rotary movement, and means including said rotors for maintaining each ribbon under tension along its axis of elongation.

* * * * *